United States Patent [19]

Penney

[11] Patent Number: 4,634,879
[45] Date of Patent: Jan. 6, 1987

[54] METHOD AND SYSTEM FOR DETERMINING SURFACE PROFILE INFORMATION

[75] Inventor: Carl M. Penney, Schenectady, N.Y.

[73] Assignee: General Electric Company, Schenectady, N.Y.

[21] Appl. No.: 714,416

[22] Filed: Mar. 21, 1985

[51] Int. Cl.$^4$ .................. G01N 21/86; G01B 11/24
[52] U.S. Cl. ................................ 250/560; 356/376
[58] Field of Search ............... 356/376, 4, 1; 250/560, 250/561

[56] References Cited

U.S. PATENT DOCUMENTS

| | | | |
|---|---|---|---|
| 3,589,815 | 6/1971 | Hosterman | 356/376 |
| 3,619,065 | 11/1971 | Agnew | 356/120 |
| 3,692,414 | 9/1972 | Hosterman et al. | 356/376 |
| 3,757,125 | 9/1973 | Okada et al. | 250/202 |
| 3,800,149 | 3/1974 | Lang | 205/205 |
| 3,976,382 | 8/1976 | Westby | 356/120 |
| 4,139,304 | 2/1979 | Redman et al. | 356/376 |
| 4,158,507 | 6/1979 | Himmel | 356/376 |
| 4,236,819 | 12/1980 | Green | 356/5 |
| 4,240,745 | 12/1980 | Green | 356/5 |
| 4,299,491 | 11/1981 | Waters et al. | 356/376 |
| 4,325,640 | 4/1982 | Dreyfus et al. | 356/376 |
| 4,336,997 | 6/1982 | Ross et al. | 356/4 |
| 4,349,277 | 9/1982 | Mundy et al. | 356/376 |
| 4,409,477 | 10/1983 | Carl | 250/227 |

FOREIGN PATENT DOCUMENTS

79/00004  1/1979  World Int. Prop. O. .

OTHER PUBLICATIONS

S. Hanumanth Rao, B. Tech., M.S., "Development of Weld Pool Imaging Techniques for the Adaptive Control of Gas Tungsten Arc Welding", The Ohio State University, 1981, pp. xi-xii, 1-5, 24-41.

R. W. Richardson et al., "A Vision Based System for Arc Weld Pool Size Control", Measurement and Control for Batch Manufacturing, ed. by D. E. Hardt, ASME WAM, Nov. 14-19, 1982, pp. 65-75.

"Fiber-Optics Couple Arthoscope to TV", NASA Tech. Briefs, vol. 5, No. 4, fall 1980, pp. 462,463.

Primary Examiner—David C. Nelms
Assistant Examiner—William L. Oen
Attorney, Agent, or Firm—Paul R. Webb, III; James C. Davis, Jr.

[57] ABSTRACT

Optical triangulation is used for determining the profile of a surface with only two photomultiplier tubes needed for optical sensing in a flying spot camera system. A feedback arrangement varies the angle at which a laser beam is applied to the surface such that the image of the beam on the surface tends to be maintained constant with respect to a linear reference position parallel to a scanning direction. Deviations in the image from its reference position as caused by surface height variations are used in the feedback arrangement to change the deflection angle. The deflection angle is in turn detected and is indicative of the variations in surface height. As an anti-noise feature, amplitude modulation is impressed upon the laser beam directed towards the surface and a filter network is used to filter photomultiplier response so as to exclude response to background optical noise. In order to maintain a very wide dynamic range, the modulation amplitude of the light applied to the surface is varied in inverse relationship to the intensity of reflected light sensed by the photomultipliers.

9 Claims, 6 Drawing Figures

METHOD AND SYSTEM FOR DETERMINING SURFACE PROFILE INFORMATION

BACKGROUND OF THE INVENTION

This invention relates to a surface profile determining system and method. More particularly, this invention relates to surface profile determination relying on the reflection of optical energy applied to the surface.

The use of various kinds of industrial vision sensors has become quite widespread. Such vision sensors commonly find application in robotics systems, particularly robotics welding systems with the sensors being used to control a welding head such that it follows a weld seam. Industrial vision sensors are used for numerous other applications such as generating data describing various dimensions of a surface, which data can be conveniently sorted electronically.

An object of the present invention is to provide a vision system which determines the vertical height of a surface point by point along a line on the surface. Thus, if the surface height is measured along a coordinate Z, in a direction parallel to the direction from which the surface is observed, and a coordinate X is measured along a straight line perpendicular to the direction of Z, then the vision system provides a value of Z for each value of X along the line. This information will be described here as a surface profile, and the system will be called a profiler or profiler system.

Profilers have been proposed or built using TV cameras, linear detector arrays and flying spot camera systems. Various optical systems can be used to generate a pattern consisting, for example, of a single or multiple lines of light to be applied to a surface in order to determine a surface profile. The light pattern is projected and observed from two moderately different directions, such that changes in a dimension of the surface in the general direction of observation and projection (the Z-direction) cause an apparent shift in the pattern. The principles of triangulation can be used to determine the exact Z-dimension of each point in the pattern, thus providing one or more surface profiles.

U.S. Pat. No. 4,349,271 issued on Sept. 14, 1982, to Joseph L. Mundy, Gilbert B. Porter, III, and Thomas M. Cipolla, entitled "NON-CONTACT MEASUREMENT OF SURFACE PROFILE", discloses such a structured light profiler. This patent teaches that, by sensing the reflected light from the pattern by use of two detector arrays (one for each of two light wavelengths) one can develop a profile mapping of a complex surface.

Although such structured light profilers using TV cameras or solid state detector arrays have been generally useful, they have proven subject to several disadvantages. In particular, the sensitivity, dynamic range and background light rejection capabilities of TV and detector array systems have posed significant problems in their use in profilers. Since the directional reflectivity of angle metal surfaces with typical industrial finishes can easily vary over factors of several thousand, the dynamic range, on the order of 100 to 200:1 for standard TV camera systems, can be greatly exceeded. Additionally, the sensitivity of such detectors often requires illumination of uncooperative surfaces by a laser with sufficient power to pose laser safety hazards. A further disadvantage of many TV and array systems is that the source light level can not be modulated at high frequency, and synchronously detected to reduce sensitivity to background radiation, because TV systems employ detector elements which integrate between scans that are repeated at a relatively low frequency, such as 30 repetitions per second.

Unfortunately, a photomultiplier tube, which is a highly sensitive light detector and has relatively good dynamic range, is too expensive and cumbersome to combine into the dense array needed by most profiler configurations. On the other hand, a detector element such as a photodiode, which is less expensive and easily made small, can be used to realize a relatively low priced and convenient array, but lacks the sensitivity and dynamic range of a photomultiplier.

In the present invention the need for a detector array is avoided by using a particular type of flying spot camera. The array is replaced by two photomultipliers, or a dual photomultiplier in a single shell, thus gaining the sensitivity, dynamic range and background rejection advantages of this type of detector.

Prior art flying spot profilers typically have used a laser beam which is scanned onto a surface. The image of the beam hitting the surface is tracked by a detector array which is offset from the angle at which the beam is directed to the surface. Using optical triangulation techniques, knowledge of the angle at which the beam strikes the surface and of the position of the beam's image on the surface allows determination of the surface profile. Because such systems use solid state detector arrays, such systems are also subject to sensitivity, dynamic range, and resolution limitations found in the detector arrays used in structured light systems. In particular, the variations in surface directional reflectivity may require the use of a relatively powerful laser necessitating various special safety precautions which are economically disadvantageous and operationally cumbersome.

As a modification of the basic flying spot camera and detector array system, a recent profile measuring system, U.S. Pat. No. 4,158,507 teaches the use of a laser beam which is scanned across a surface and has its image detected by a single photomultiplier tube. In order to trace the path of the scanned beam across the surface, an optical grating is disposed between the image of the beam and the photomultiplier. As the beam sweeps across the surface, the sweep time between various opaque strips on the grating is indicative of the slope of the surface.

Although this flying spot system using an optical grating has overcome several of the disadvantages of the detector array arrangements, its measurement capability is still undesirably limited. In particular, if the grating is chosen to be quite fine (very narrow alternating transparent and opaque strips), such that high spatial resolution is obtained, the system will be able to detect small variations in surface slope. However such very narrow grating strips can produce erroneous or misleading measurements. Specifically, if there is a sharp surface change or major vertical step in the surface, a beam's image may jump over more than one stripe of the grating such that the detection system will not indicate properly the height of that step.

OBJECTS OF THE INVENTION

It is a primary object of the present invention to provide a new and improved system or apparatus and method for determining profile information.

A more specific object of the present invention is to provide an improved method and system for surface profile determination having a highly sensitive optical sensing or detector arrangement such that safe, low power optical sources may be used.

Another object of the present invention is to provide an improved method and apparatus for surface profile determination having a large dynamic range.

Yet another object of the present invention is to provide an improved surface profile determination method and system having a high degree of rejection of background light.

A still further object of the present invention is to provide an improved method and system for surface profile determination having a very high degree of resolution.

SUMMARY OF THE INVENTION

The above and other objects of the present invention and the attendant advantages will become more apparent as the description proceeds and are realized by a system and method for determining profile information from a surface of an object in which a light beam is generated and passed through a light modulator and a Y-scanner, and in addition through an X-scanner before being directed to the surface to be profiled. Light scattered from the beam by said surface is imaged back to a photomultiplier detector system incorporating means to determine whether the imaged light spot is above, directly on or below a straight line in the direction of image motion produced by the X-scan when the observed surface is perfectly flat and lies in the plane perpendicular to the direction of observation. Hereafter, said line will be referred to as the sensing line. The direction of spot projection is configured to be at a moderate angle to the direction of observation of the photomultiplier detection system, and these two said directions are adjusted to be in a plane perpendicular to the direction of X-scan at the observed surface. As a result of this orientation, a change in surface height in the Z-direction, perpendicular to both the X- and Y-directions, will produce a change in the image position at the detector such that, in the absence of a change in Y-deflection, the image will move in a direction perpendicular to the sensing line. An essential element of the present invention is that the Y-scanner is controlled by feedback components from the detector to stabilize the image of the beam on the surface at a constant Y-position such that the image tends to remain centered on the sensing line. In recognition of this function, the Y-scanner will be referred to subsequently as the image stabilization beam adjustor.

A purpose of the light modulator is to modulate the transmitted beam of light at a relatively high frequency, typically 100 Kilohertz, such that the detector signal components resulting from scattered components of this light will also vary at the same frequency, and thereby can be separated from components of background light by electrical filtering. A second element of this invention is use of variation of the modulation amplitude in response to variations in surface reflectivity, such that this amplitude is decreased when the surface reflectivity is high, and increased when the surface reflectivity is low in such a way that the variations in amplitude of the corresponding modulation amplitude of the detector signals are minimized, augmenting the dynamic range of the detector system.

In accordance with the present invention, there is provided an optical beam source for generating an optical beam for application to the surface; an image stabilization beam adjustor operable to receive the beam from said optical beam source and to apply a variable Y-deflection angle to the beam prior to its application to the surface; sensor system means to sense reflected optical energy corresponding to an image from the beam hitting the surface and operable to sense any changes in the image position which are caused by variations in surface height, and connected to the image stabilization beam adjustor and being operable for causing the image stabilization beam adjustor to alter the beam deflection angle dependent on the sensed changes in the image position from a reference position in a Y-direction, and tending to maintain the image in its reference position independent of variations in surface height, and wherein the system determines the surface height by detecting the amount of the alteration. The sensor system means may be provided with first and second sensors each having a separate output, the first and second sensors being operable to sense different portions of the reflected optical energy, where the sensors are so situated that the fraction of light detected by each sensor depends on the Y-position of the image. A subtracter is included for producing a difference output dependent on the difference in outputs of the first and second sensors and the difference output causes the image stabilization beam adjustor to alter the Y-deflection angle to compensate for any variations in surface height such that the Y-position of the image tends to remain constant. Surface height is determined then from the amount of the change in Y-deflection necessary to maintain the image at a constant Y-deflection. The image stabilization beam adjustor may be in the form of an acousto-optic device, while the sensor system means may further include a controlled oscillator. A laser may be used as the optical beam source.

In operation, in a preferred embodiment, the image stabilization beam adjustor provides a beam deflection angle dependent on the signal of an output of the controlled oscillator, while the controlled oscillator receives a control input derived from at least one output of the sensor means, the control input being dependent on sensed changes in the image position from its reference position. The control input is supplied by an angle control circuit which stabilizes the control input when the image is in its reference position. The system further comprises an X-scanner for causing the beam to scan the surface in an X-direction perpendicular to the Y-direction and the sensor system means includes an X-indicating circuit having an output which indicates the X-position of the beam.

The system may further include a device which produces a motion of the image of the scanned beam which is exactly equal to, but opposite in direction to, the motion of the image caused by the scan of the beam in the X-direction. This image descanner causes the image of the beam swept in the X-direction to appear to be confined within a narrow line. Consequently, background light reaching the sensor means can be reduced by passing the image through a narrow slit. In practice the image descanner can be implemented simply by passing the light from the image back through the X-scanner.

The system may further include a light filter which transmits the light from the optical beam source, but stops light of other colors, in order to reduce the background light reaching the detector.

The system may further include means for varying the intensity of the beam applied to the surface by way of amplitude modulation, at a high frequency, typically 100 kHz or greater. The sensor system means would then further include an electrical filter means to filter at least a first sensor output from the sensor means and to generate at least a first filtered output, the filter means allowing passage of signals having a frequency of the modulating function and rejecting other signals such that the first filtered output is made more nearly independent of background optical energy.

The system may further include a means to provide a low frequency (typically 10 kHz or less) variation of the average modulation amplitude of the beam applied to the surface and a feedback circuit connected between the sensor means and the intensity varying means. The feedback circuit is operable to generate a reflection output dependent on the magnitude of the reflected optical energy sensed by the sensor means and operable to control the intensity varying means at least partly dependent on the reflection output so as to increase the modulation amplitude of the beam for a relatively low reflection output and so as to decrease the modulation amplitude of the beam for a relatively high reflection output. This procedure increases the dynamic range of the system.

BRIEF DESCRIPTION OF THE DRAWINGS

The above and other features of the present invention will be more readily understood when the following detailed description of the invention is considered in conjunction with the accompanying drawings wherein like characters represent like parts throughout the several views and in which.

DETAILED DESCRIPTION OF THE INVENTION

Figure 1:
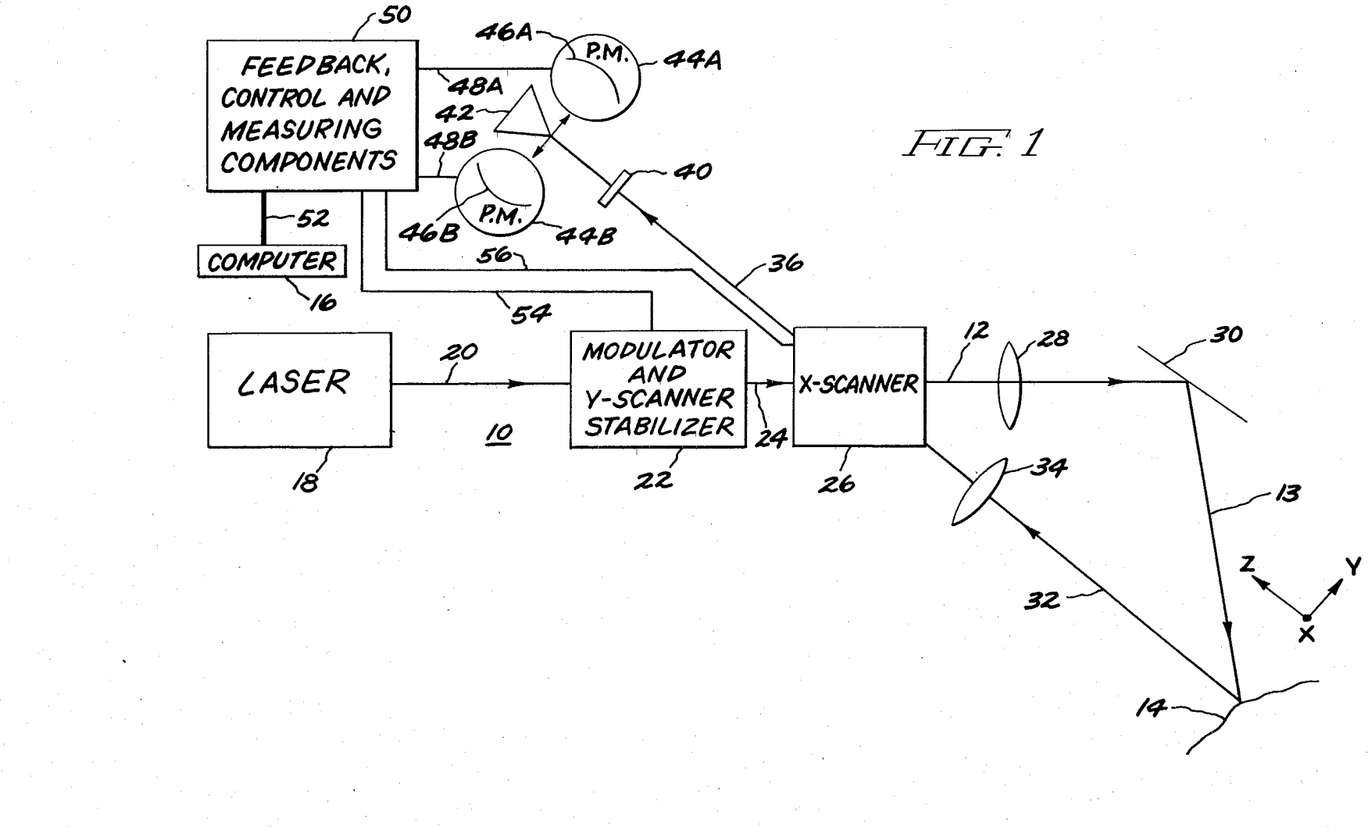
FIG. 1 is a schematic illustration of the principle components of the present invention attached to a computer.

The principle components of the present invention are shown in FIG. 1 as a system for profile determination identified generally by reference character 10 and serve to apply an optical beam 13 to a surface 14 which is to be profiled. The surface 14, which is only partly shown, may be part of a work piece or other object and may include surface portions from more than one object or work piece. The system 10 is adapted to develop and provide profile information to a computer 16 which may simply store the profile information or, alternately, use the profile information for guiding a tool such as a robotic welder.

The optical beam 13 is originally generated by an optical beam source such as laser 18 which outputs a beam 20 of optical energy. As used herein the term "optical energy" includes any electromagnetic radiation such as derived from a light, ultraviolet, or infrared source.

The beam 20 generated by laser 18 is supplied to a modulator and Y-scanner stabilizer which is shown in FIG. 1 as a combined element 22. The modulator-stabilizer 22, which can be an acousto-optic device, is used to control the movement of the beam 13 such that its image is stabilized in a reference position in the Y-direction. Additionally, the modulator-stabilizer 22 amplitude modulates the beam 20 with a modulating function in order to minimize background light effects on the system 10. The modulator-stabilizer 22 also varies the intensity of the input beam 20 such that the amplitude modulation of the output beam 24 from the modulator-stabilizer 22 is inversely dependent upon the intensity of optical energy reflected from the surface 14 toward the detector system. The specifics of these features of the modulator-stabilizer are described in detail below.

The output beam 24 from the modulator-stabilizer 22 is fed into an X-scanner 26 which causes the beam 13 to be scanned in an X-direction normal to the plane of the view of FIG. 1. Although the X-scanner 26 could be an acousto-optic scanner or device as with modulator-stabilizer 22, a mirror mounted on a galvanometer or a rotating prism may be used for the X-scanner 26.

The output beam 12 of the X-scanner passes through a transmitting lens 28 and is reflected by a mirror 30 to cause beam 13 to strike the surface 14.

The beam 32 reflected from surface 14 (diffuse reflection of the image of beam 13 on surface 14) passes through a receiving lens 34 and back to the X-scanner 26. Although not necessary to the present invention, it is preferable to have the reflected beam 32 descanned by the X-scanner 26 to generate a descanned reflection beam 36. The descanned reflection beam 36 will have a relatively constant X-position regardless of the position of the mirror used as the X-scanner 26. The beam 36 is supplied to sensor system means including an apertured light shield 38 which is used to block light not having the proper X-position. If desired, an optional optical filter 40 may be used between the X-scanner 26 and the light shield 38. The optical filter 40 serves to minimize light outside the frequency of light supplied by the laser 18, thereby minimizing the effect of optical noise on the system 10.

The descanned reflected beam 36 is fed to a sharp-edged silvered prism 42 which splits the light into complementary non-overlapping positional (i.e., dependent on position) portions which are fed to the photomultipliers 44A and 44B with reflectors 46A and 46B being used to ensure that the reflected optical energy is directed to the corresponding photomultiplier.

The photomultipliers 44A and 44B together include only two sensors. That is, unlike numerous prior art designs which require arrays of sensors, the present invention requires only the two photomultipliers.

The photomultipliers 44A and 44B supply respective first and second sensor outputs indicative of the reflected optical energy corresponding to the image resulting from beam 13 hitting the surface 14. The sensor outputs are respectively fed on lines 48A and 48B to feedback, control, and measuring components 50. The details of components 50 will be discussed more fully below with respect to FIG. 6, but the major functions include controlling the modulator-stabilizer 22 by line 54 and the X-scanner 26 by line 56 and feeding profile information to a computer 16 by way of several signal lines or a data bus shown schematically as line 52.

Components 50 also function to filter the signals from the photomultipliers 44A and 44B and cause the modulator-stabilizer 22 to impress a modulating function upon the beam by amplitude modulation. This modulation and subsequent filtering process greatly reduces any response of the system 10 to background optical energy even if it is within the passband of the optional optical filter 40. The components 50 further operate to cause the modulator-stabilizer 22 to control the beam 20 modulation amplitude such that it is inversely dependent upon the sum of the reflected optical energy sensed by the photomultipliers 44A and 44B. The dynamic range of the system 10 is thus expanded by increasing the modulation amplitude of the optical beam 12 when the directional reflectivity of the surface 14 is poor and by decreasing the modulation amplitude of the optical beam 12 when the directional reflectivity of the surface 14 is relatively high.

Figure 2:
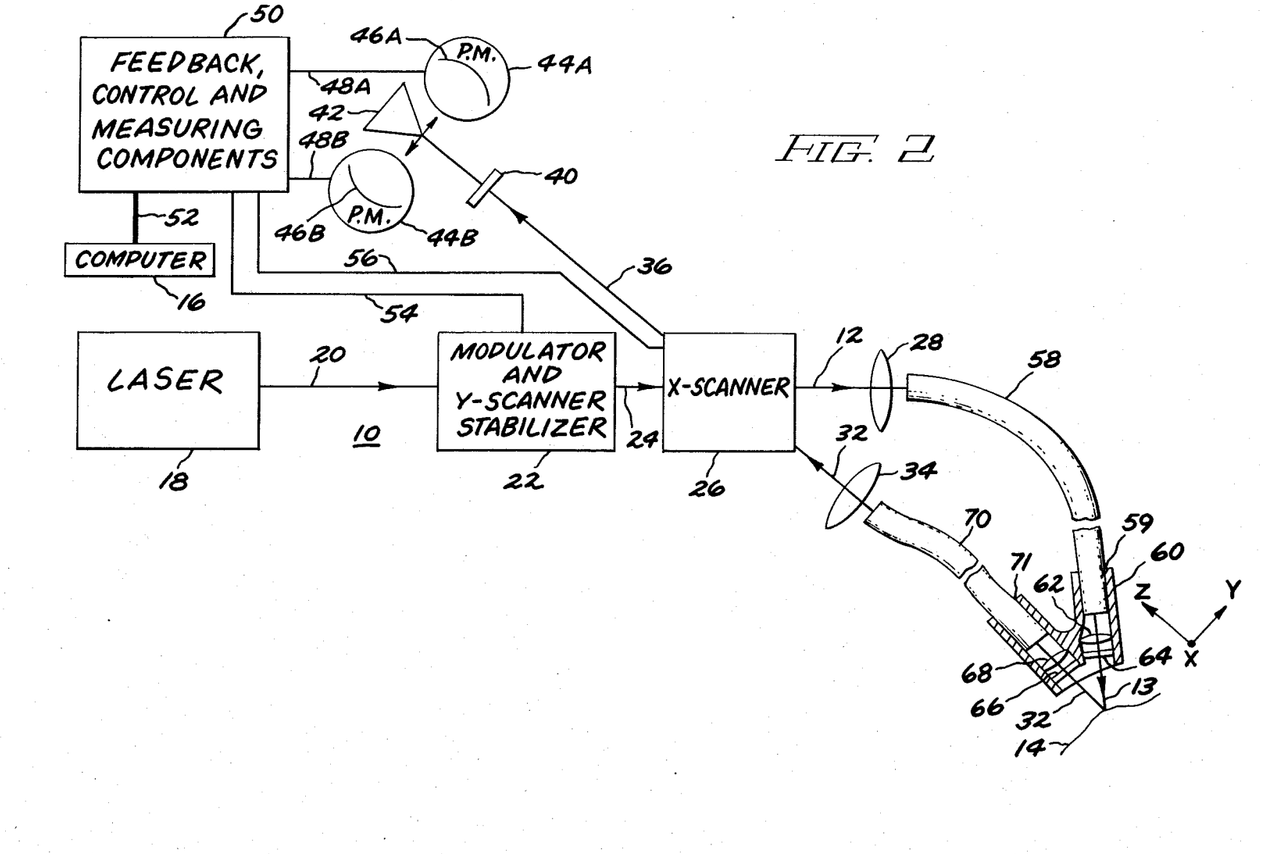
FIG. 2 is a schematic of the principle components of an alternate embodiment of the present invention attached to a computer.

The principal components of an alternate embodiment of the present invention are schematically illustrated in FIG. 2 and identified by reference character 11. The system 11 differs from the system 10 only in the manner of transmitting the beam between the X-scanner 26 and the surface 14. Accordingly, most of the components are identical with the corresponding components of FIG. 1 and identified with like reference characters.

Concentrating on those parts of system 11 which are different from system 10, it will be apparent that the optical beam 12 passes from the transmission lens 28 into one end of a coherent optical fiber bundle 58 having its other end terminating in one input opening 59 in head 60. The bundle 58 serves to carry the beam 12 to the head 60. The head 60, which is shown in cross-section, may be attached to a tool (not shown) movement of which is controlled by computer 16. The beam 12 passes through and out of the bundle 58 and through a lens 62 before the final beam 13 strikes the surface 14. The reflected beam 32 from surface 14 passes through a lens 68 mounted in head 60 and is fed into a coherent receiving optical fiber bundle 70 having one end terminating in a second opening 71 in head 60.

The system shown in FIG. 2 is especially advantageous in applications where it is desired to move a head such as head 60 along the surface of a work piece because it is not necessary to move all of the optical and electrical components of the system.

The present invention uses the principles of optical triangulation to determine surface profiles. In optical triangulation, knowledge of a source position, a sensor position, the angle at which the source directs a beam towards a surface, and the position of the beam's image on the surface as sensed by the sensor is sufficient information to determine the distance from the sensor or from the detector to the surface by applying well-known mathematic formulas to operate on this information. By scanning a light beam along a surface and repeatedly applying optical triangulation, the profile of the surface along the direction of scanning may be determined.

Figure 3:
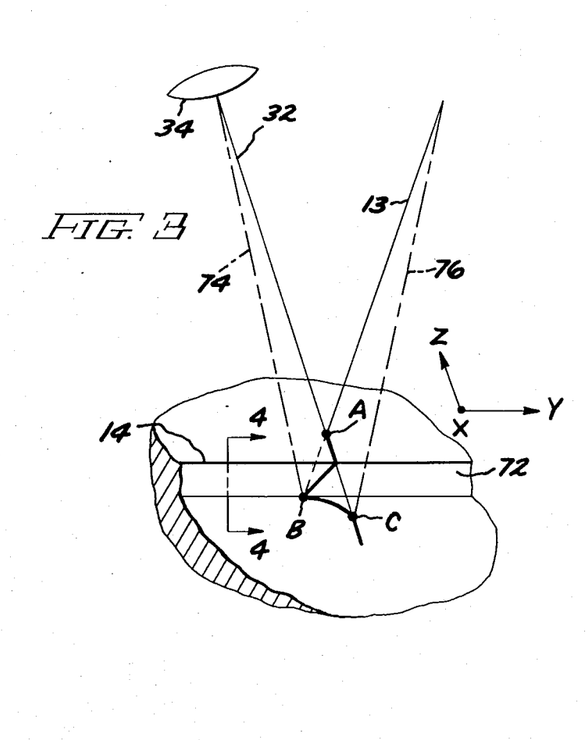
FIG. 3 is a canted view of a scanned surface for illustrating the principles of operation of the present invention.
Figure 4:
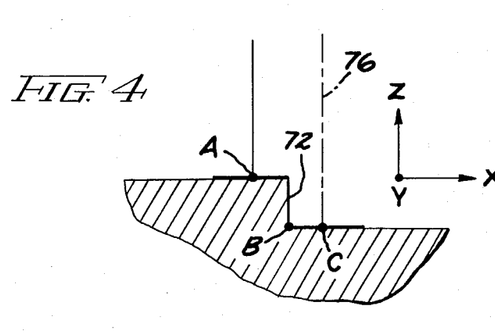
FIG. 4 is a cross-section view along lines 4—4 of FIG. 3.
Figure 5:
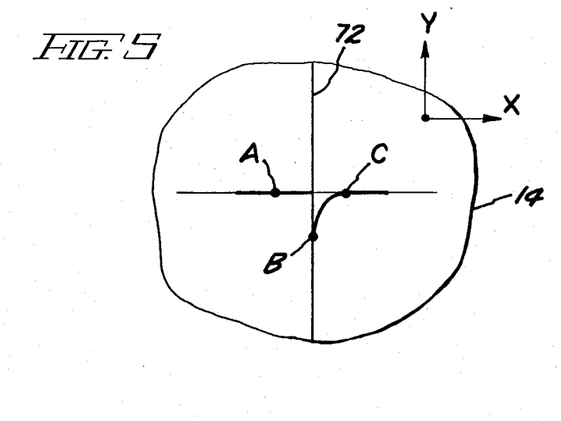
FIG. 5 is a top view of the surface of FIGS. 3 and 4.

With reference now to FIGS. 3, 4, and 5, the particular principles of operation of the present invention will be explained. FIG. 3 shows a simplified side view illustrating the beam 13 applied to the surface 14 and the reflected beam 32 received by the receiving lens 34.

FIG. 4 shows the view taken along lines 4—4 of FIG. 3, whereas FIG. 5 shows a view normal to surface 14.

The beam 13 is scanned along the surface 14 in the X-direction and its image corresponding to reflected beam 32 is received by the lens 34. When the beam 13 hits the vertical (i.e., Z-direction perpendicular to X- and Y-directions) step 72, the image corresponding to the reflected optical beam 32 is instantly displaced to the position shown for dashed return beam 74. The image of reflected beam 32, which had previously appeared at point A, now appears to the receiving lens at point B corresponding to this reflected beam 74.

The shift in image position from point A to point B constitutes a Y-direction change and previous designs have sensed this change by a detector array in order to calculate the size of the vertical step 72. However, it will be noted that point B is not only changed from point A in the Z-direction corresponding to the height measurement which is to be made, but it is different from point A in the Y-direction. This undesired Y-direction change from point A to point B may introduce errors in the measurement process based upon measuring the change in image position corresponding to the change from reflected beam 32 to reflected beam 74. Additionally, the measurement of this change in Y-direction image position requires a sensor or detector array in order to track the changes in image position.

Instead of using the shift in Y-direction position of the image from point A to point B, an important feature of the present invention is that the feedback, control, and measuring subsystem 50 (refer back to FIGS. 1 and 2) is used to change the deflection angle of the applied optical beam 13 such that it assumes the position of beam 76 shown in dot-dashed line 76 in FIG. 3 and immediately behind beam 74 in FIG. 4. Note that by changing the applied beam 13 to the position of applied beam 76, the image of the beam now occurs at point C which again corresponds to the reflected beam 32. The image position corresponding to point C has the same Y-coordinate as point A such that the image of the applied beam will tend to maintain a normal or reference position in the Y-direction.

The present invention uses components 50 discussed in detail below with respect to FIG. 6 in order to realize a feedback control arrangement such that the image of the applied beam tends to maintain its reference position in the Y-direction. The reference position corresponds to points A and C and may be considered as a straight line including the points A and C as best visualized in FIG. 5. Thus, as the beam 12 is scanned in the X-direction its path along surface 14 (see especially FIG. 5) will be substantially maintained along the line including points A and C and extending beyond points A and C. When the beam hits the vertical step 72 it will be slightly displaced from this line A to C to assume the position of point B, but the feedback control arrangement will bring it back to the line of points A and C. It will be readily appreciated that FIGS. 3-5 are somewhat simplified for illustrative purposes in that the scan line between points B and C may include a component in the X-direction corresponding to the left to right (FIGS. 4 and 5) X-direction scanning. However, components 50 will have a very short feedback time such that the beam 12 will be modified very quickly in order to maintain its image position in the reference position corresponding to the line A to C. Thus, when the beam 12 steps down the vertical step 72, its deflection angle will be almost instantly changed to that shown by 76 in FIG. 3 to return the image to its reference position line.

The same optical triangulation principles which allowed one to calculate the size of the vertical step 72 by considering the Y-direction shift in image position from point A to point B may be used to calculate the magnitude of the step 72 based on the change in deflection beam angle from beam 72 to beam 76. Most advantageously, the height change or Z-direction change will be relatively independent of any Y-direction changes due to the fact that the system holds the image position relatively constant in its Y-direction reference position corresponding to the line A to C. Additionally, the holding of the image position relatively constant in the Y-direction allows one to use an optical sensing arrangement without the requirement of sensor or detector arrays and their corresponding limitations.

Figure 6:
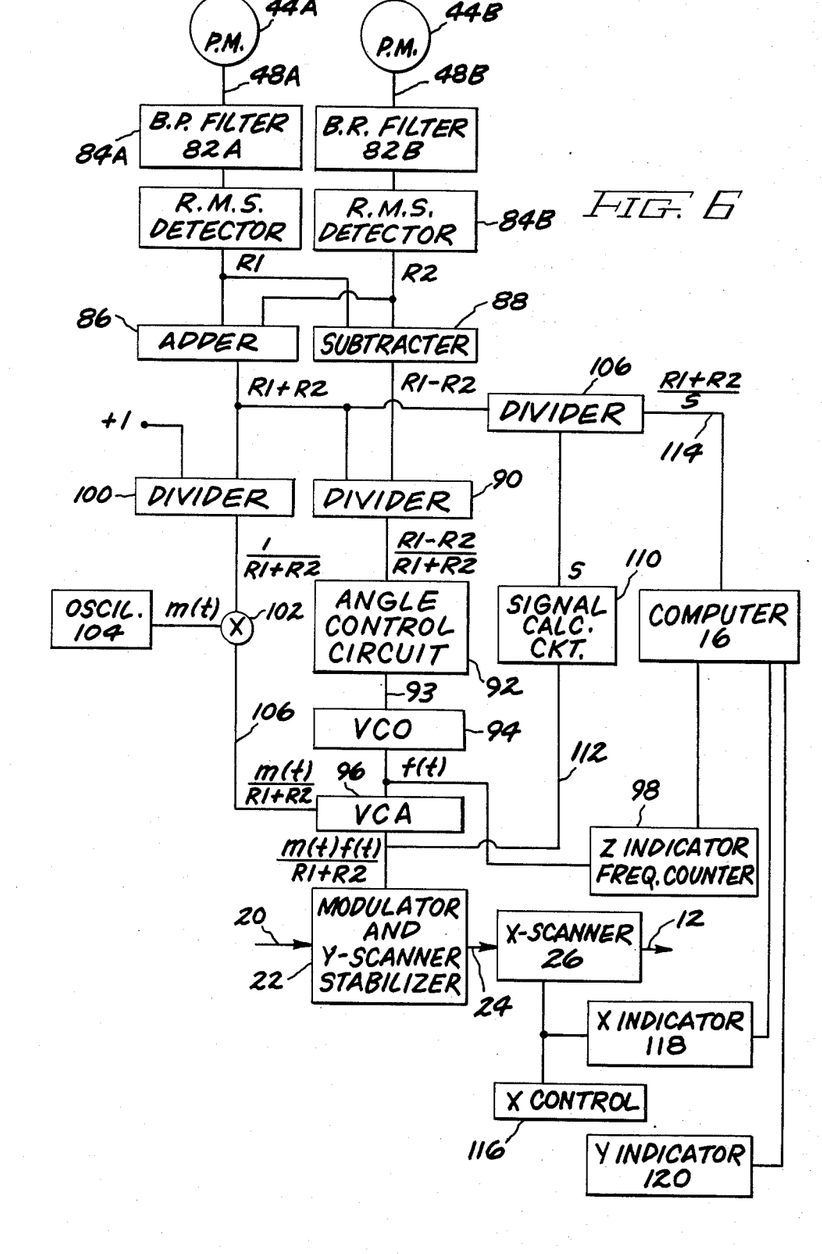
FIG. 6 is a circuit diagram illustrative of a feedback, control, and measuring subsystem of the present invention.

Turning now to FIG. 6, a schematic of various circuits which may be used to make up components 50 of FIGS. 1 and 2 will be discussed in detail. FIG. 6 shows the circuits of components 50 in combination with the photomultipliers 44A and 44B, the modulator and Y-scanner stabilizer 22 with optical beam 24 extending to the X-scanner 26, and the computer 16.

The sensor system means including photomultipliers 44A and 44B supply respective first and second sensor outputs on lines 48A and 48B. The outputs on lines 48A and 48B are representative of different positional portions of reflected optical energy. That is, the outputs of the photomultipliers 44A and 44B are representative of reflected optical energy from different portions of the surface 14. Not only are the outputs on lines 48A and 48B representative of different positional portions of common wavelength optical energy, but they are complementary in that together they represent all of the optical energy sensed by the sensor means. With the description that follows, it will be apparent that the first and second photomultipliers 44A and 44B are together operable to provide sufficent optical energy sensing for components 50 to determine surface height.

The sensor outputs on lines 48A and 48B are fed into an electrical filter means comprising the parallel arranged filters 82A and 82B. The bandpass filters 82A and 82B allow passage of signals having a frequency of a modulating function m(t) which had been impressed upon the beam of light by the modulator-stabilizer 22. Accordingly, even background light which has the proper wavelength and position to pass through the optical filter 40 (FIGS. 1 and 2) will have very little effect on components 50. The filters 82A and 82B provide first and second filtered outputs which are substantially independent of such background optical energy.

The outputs from the filter means comprising filters 82A and 82B are fed in parallel to respective root-mean-square detectors 84A and 84B which provide corresponding outputs R1 and R2. Each of the outputs R1 and R2 is dependent upon the radiant flux input to the respective photomultipliers 44A and 44B. In particular, the complementary reflection signals R1 and R2 would be approximately proportional to the root-mean-square radiant flux input applied to the photomultipliers 44A and 44B as caused by reflection from the modulated optical beam 13 (FIGS. 1 and 2).

It should be noted that the photomultipliers 44A and 44B have output currents which are directly proportional to the radiant flux input over a limited range and at a constant supply voltage. As will be readily appreciated, a current to voltage converter and/or non-linear function generator (to compensate for photomultiplier non-linear characteristics) may be used in between each photomultiplier and the corresponding filter.

The signals R1 and R2 are added in an adder 86 and are subtracted in a subtracter 88. The difference signal R1 minus R2 is then divided by the sum signal R1 plus R2 in the divider 90, the output of which is fed into an angle control circuit 92.

The output of the angle control circuit is fed as a control input to a voltage controlled oscillator 94 which generates an angle control function f(t). The angle control function is fed into a voltage controlled amplifier 96 which provides amplitude modulation for noise reduction and amplitude feedback for expanding system dynamic range as explained below. Additionally, the angle control frequency is fed into a Z-indicator frequency counter 98 to provide an output indicative of the height of the surface 14.

The sum signal R1 plus R2 is additionally fed into a divider 100 which takes the reciprocal of the reflection output R1 plus R2. Because the reflection output R1 plus R2 is dependent on the magnitude of reflected optical energy sensed by the photomultipliers 48A and 48B, the output of divider 100 will be inversely proportional to this magnitude. This inverse reflection output is fed to a multiplier 102 where it is combined with a modulating function m(t) supplied by an oscillator 104. The output of the multiplier 102 is fed as a control input on line 106 to the voltage controlled amplifier 96.

The reflection output R1 plus R2 may optionally be fed into another divider 106 which is supplied a signal S from signal calculation circuit 110. The signal calculation circuit 110 may receive as its input the output of the voltage controlled amplifier 96 on line 112. More particularly, the signal calculation circuit 110 may simply be a function generator or other known circuit such that the output signal is representative of the optical energy in beam 13 applied to the surface. Knowing the frequency and amplitude of the signal fed to the modulator stabilizer 22 and the intensity of the light output by laser 18 (FIGS. 1 and 2), circuit 10 calculates the signal S representative of the applied optical energy. The output signal S representative of the applied optical energy may be divided into the reflection output R1 plus R2 to yield a signal on line 114 which is representative of the directional reflectivity of the surface 14 at a particular point. This output on line 114 may be fed into the computer 16.

Components 50 additionally include an X-control circuit 116, an X-indicator circuit 118 and a Y-indicator circuit 120. The X-control circuit 116 simply directs the X-scanner 26 to scan at a relatively low frequency, for example 30 Hertz. The X-indicator circuit 118 senses the control signal fed to X-scanner 26 and feeds an output to the computer 16 representative of the X-position of the beam 12. For example, if the X-scanner 26 is a mirror mounted on a galvanometer, the X-indicator 18 may simply be any of various known devices to detect the angle of the mirror. Alternately, if the X-scanner is an acousto-optic device, the X-control 116 could be a volage controlled oscillator and the X-indicator 118 could be a frequency counter. The Y-indicator 120 may be a frequency counter, for example, if the Y-deflector is an acoustic-optic cell.

The basic operation of the image stabilization feature of the present invention will now be outlined with particular reference to FIGS. 3–5 and 6. When the applied beam 12 is scanned in the X-direction from point A to point B, the image of the beam 12 on surface 14 moves away from its reference position corresponding to line AC of FIG. 5. This dislocation in image position causes a change in the relative values of R1 and R2 as output from the detectors 84A and 84B. In particular, the outputs R1 and R2 in FIG. 6, which had been previously equal, are now unequal. The step 72 has caused the beam 36 (FIGS. 1 and 2) no longer to be centered on the edge of the prism 42 (FIGS. 1 and 2).

The imbalance in R1 and R2 is reflected in the output of divider 90, which output is the ratio of signal differences to signal sums. The division by R1 plus R2 is preferably used to provide an imbalance signal which is independent of the total reflection output.

The imbalance signal output by divider 90 as the ratio of reflection difference to reflection sum is fed into the angle control circuit 92. The angle control circuit 92 may be realized by various circuit configurations as, for example, an integrator. When the imbalance or ratio signal fed to the angle control circuit 92 indicates an imbalance, its output on line 93 will be likewise dependent upon this imbalance. The output on line 93 constitutes a control input to the voltage controlled oscillator 94 so as to change the frequency of angle control function f(t). Because the modulator-stabilizer 22 has a deflection angle dependent upon the frequency of angle control function f(t), the ratio signal output of the divider 90 is used to change the deflection angle by changing the frequency out of the voltage controlled oscillator. In particular, an imbalance between the outputs of photomultipliers 44A and 44B will be compensated for by changing the deflection angle of modulator-stabilizer 22. Thus, the beam 12 will move into its phantom line position 76 (FIGS. 3 and 4) to return the image position to the line corresponding to line AC of FIG. 5. This feedback arrangement will result in the image position tending to be maintained along its reference position of line AC regardless of the variations in surface height. The signals R1 and R2 will be essentially maintained equal with the beam 36 bisected by prism 42.

The voltage controlled oscillator 94 may for example have a center frequency of 40 Megahertz corresponding to zero volts input and variable up and down dependent upon the control input voltage on line 93.

When the feedback arrangement has brought signal R1 and R2 to the same magnitude, the voltage controller oscillator 94 should maintain the same frequency output. Accordingly, the angle control circuit 92 will avoid any changes in the control input which it supplies on line 93 when the difference between R1 and R2 is zero. As mentioned, the angle control circuit 92 could be an integrator. Alternately, various sample and hold circuits could be used to stabilize the frequency of angle control function f(t) upon the signals R1 and R2 reaching equilibrium. If desired, one could alternately use a feedback arrangement from the output of the voltage controlled oscillator 94 back to its input. Such a system would use a frequency to voltage converter having its input connected to the output of VCO 94 and having its output fed as a feedback signal into a difference amplifier. The other input of the difference amplifier would be an error signal constituted by the imbalance ratio of difference to sum as output by the divider 90. When the output of divider 90 was equal to zero, the oscillator 94 would maintain a constant frequency. However, when the image position had been moved in the Y-direction, the system would automatically modify the modulator-stabilizer 22 deflection angle such that the signals R1 and R2 are brought into equilibrium.

Regardless of which angle control circuit is used, it will be readily understood that the output frequency of the voltage controlled oscillator 94 will be indicative of the deflection angle supplied by modulator-stabilizer 22. Because this deflection angle compensates for variations in the surface height or Z-direction changes in the surface 14, the frequency of output of the voltage controlled oscillator 94 may be counted by Z-indicator frequency counter 98 and used to supply a signal to computer 16 indicative of profile information. The Z-indicator frequency counter 98 serves as a first measuring circuit, or more specifically a height indicating circuit, which receives a first measuring input (the angle control function f(t) which is dependent upon the photomultipliers 94A and 94B. The output of the height indicative circuit 98 is a height signal or, more generally, a profile output. If desired, the circuit 98 may include a function generator to take into account any nonlinearities in the relationship of the deflection angle of acousto-optic or modulator-stabilizer 22 and the frequency of its input angle control function f(t).

At the same time as the Z-indicator frequency counter 98 is providing Z-information from the surface 14, the X-indicator circuit 118 will provide corresponding X-position data to the computer 16.

The system as outlined above calls for a regular scanning in the X-direction and an image stabilization in the Y-direction. In order to allow three-dimensional contour information to be compiled, various arrangements could be used to accomplish Y-direction scanning. For example, the embodiment of FIG. 2 could have the head 60 movable along the surface 14 in order to vary the Y-position of surface 14 which is scanned. This would of course move the reference position of the image dependent upon the position of head 60. Alternately, the surface 14 could be moved relative to the head 60 or to the system 10 of FIG. 1 to accomplish Y-direction scanning.

A more sophisticated way of accomplishing Y-direction scanning might use a Y-scanner in between the X-scanner 26 and the photomultipliers 44A and 44B (FIGS. 1 and 2). Such a Y-scanner would operate on the optical beam 36 and effectively change the equilibrium position whereas outputs R1 and R2 are equal. When using such a system, the Y-indicator 120 (FIG. 6) would have to take into account the movement of the reference position of the image of beam 12 in the Y-direction as caused by the additional Y-scanner. Such an additional Y-scanner could be a mirror mounted upon a galvanometer or an acousto-optic device. Such a system would allow one to move the reference line AC (FIG. 5) in the Y-direction such that the computer 16 (FIGS. 1, 2, and 6) would receive X, Y, and Z inputs without the necessity of moving the head 60 or surface 14.

At the same time as the computer 16 receives the profile information from the various indicator circuits 98, 118, and 120, the computer 16 may receive a directional reflectivity indication on line 114. If desired, the signal on line 114 may be dependent upon more sophisticated function generation circuits to avoid or minimize any nonlinearities in the signals R1 and R2.

It should be noted that initialization circuits could be used with the dividers 90, 100, and 106 in order to avoid dividing by zero. Various known techniques for analog signal division may be used. One option to avoid dividing by zero is to use function generation circuits at the divisor inputs of the dividers 90, 100 and 108, such divisor function generators providing a minimum divisor input to the various dividers.

With particular reference to FIG. 6, one method for implementing the amplitude modulation and dynamic range expansion techniques of the present invention will be discussed. The reciprocal or inverse reflection output from divider 100 is multiplied by the modulating function m(t) in the multiplier 102. The output of the multiplier 102 on line 106 accordingly will be dependent upon the modulating function and inversely proportional to the reflection output R1 plus R2. This signal is fed as the control signal to the voltage controlled amplifier 96 such that the amplitude of the VCA output fed to modulator-stabilizer 22 will be dependent upon the modulating function and inversely dependent upon the reflection output. Because the modulator-stabilizer 22 modulates the optical energy in beam 20 dependent upon this amplitude, beam 24 will be modulated in accord with the modulating function and inversely relative to the reflection output.

The modulating function m(t) will preferably be a positive periodic function. For example, the modulating function might simply be a one Megahertz (1 Mhz) sine wave with a DC offset to ensure that it remains positive. The modulating function should remain positive because changes in its sign would simply cause a 180 degree phase shift in the output of voltage controlled amplifier 96. Moreover, the chopped or modulated beam 24 cannot have a negative amplitude. Alternately, to avoid use of a DC offset, the modulating function m(t) could simply be a sinusoid multiplied by itself such that it would always be positive.

The voltage controlled amplifier 96 serves as an intensity varying means to vary the intensity of the beam applied to the surface in dependence upon the modulating function. That is, the intensity varying means or VCA 96 causes the modulator-stabilizer 22 to chop the beam 20 to provide a chopped or modulated beam 24 having an amplitude dependent upon the modulating function. Accordingly, the radiant flux sensed by the photomultipliers 44A and 44B will be dependent upon the modulating function. The response of photomultipliers 44A and 44B which is not dependent upon the modulating function will simply be responses to the background light or optical noise. Accordingly, the bandpass filters 82A and 82B have a bandpass characteristic to allow responses within the frequency at which the light beam is chopped. Assuming that the modulating function is a sinusoid with a frequency of one Megahertz, the bandpass filters would have a center frequency of one Megahertz. Thus, extraneous noise or response to optical background conditions would be minimized by chopping the light beam applied to the surface and filtering the response in accord with the frequency at which the light beam is chopped or modulated. The filters 82A and 82B reject the noise signals, whereas the detectors 84A and 84B provide a phase independent output based upon the sensed reflection magnitude from photomultipliers 44A and 44B.

In addition to providing the intensity variation of the beam based upon the modulating function, the voltage controlled amplifier 96 may serve to compensate for variations in the directional surface reflectivity of surface 14. Basically, a highly reflective surface will cause an increase in R1 and R2 which will in turn decrease the amplitude of the control signal fed from voltage controlled amplifier 96 to modulator-stabilizer 22. This decrease in amplitude of the control signal fed to modulator-stabilizer 22 causes a lower intensity of optical energy to be fed to the surface 14.

As an example of how the reflectivity feedback arrangement including divider 100 and VCA 96 as part of a feedback circuit allows the expansion of dynamic range of the present system 10, we may assume that the system is tracking a flat surface with R1 equal to R2. When the optical beam 12 is directed towards a part of the flat surface with a high level of reflectivity such that the reflection output R1 plus R2 is doubled, this will cut the RMS amplitude of the light intensity in beam 24 about in half by operation of VCA 96 acting on acousto-optic device 22. On the other hand, if the beam 13 moves on to a part of the surface 14 which has a quite low directional reflectivity such that the reflection output R1 plus R2 is cut in half, the RMS intensity of the beam 24 and thus beam 13 will be doubled.

It will be readily understood that nonlinearities in the photomultipliers 44A and 44B, modulator-stabilizer 22, and various other components may cause the modulator-stabilizer 22 to attenuate the beam 20 with slight variations from inverse proportionality to the directional reflectivity of the surface 14. However, the system can readily accommodate large shifts in the directional reflectivity of the surface without components saturating or otherwise introducing distortion causing nonlinearities in the measurements. Note that minor nonlinearities in the reflection output R1 plus R2 would not affect the X, Y, and Z measurements. The modulator-stabilizer 22, which preferably is an acousto-optic device, thus serves as a beam attenuator so that the intensity of the beam applied to the surface can be varied for expanding the dynamic range of the system 10 or 11.

It should be noted that the feedback arrangement based upon reflection output R2 and R2 could use a different voltage controlled amplifier than VCA 96 which is also used to impress the modulating function upon the system. Indeed, numerous other arrangements could be used for both impressing the modulating function upon the beam and for the dynamic range expansion by use of reflectivity feedback.

The method of the present invention will be readily understood from the above as including the steps of directing the optical beam 12 onto the surface 14, sensing reflected optical energy corresponding to the image resulting from the beam hitting the surface, the image having a reference position in a Y-direction, and detecting any Y-direction changes of the image position as caused by variations in surface height (Z-direction changes). The angle at which the beam 12 is directed to the surface is then altered to compensate for changes in the image position which are caused by variations in the surface height such that the image will tend to maintain its reference position corresponding to line AC of FIG. 5. The surface height is then determined by detecting the amount of alteration in that the frequency out of VCO 94 (FIG. 6) is used to determine surface height.

Altering of the angle of the beam is preferably accomplished by acousto-optic device serving as modulator-stabilizer 22 along with the feedback components 50. The surface 14 is scanned in an X-direction with the beam 12, the X-direction being perpendicular to the Y-direction. Sensing of the reflected optical energy is accomplished by a sensor means comprising photomultipliers 44A and 44B serving as first and second sensors. The sensor system means includes components 50 which detect the amount of alteration and determine surface height. The first and second sensors (photomultipliers 44A and 44B) are together operable to provide sufficient optical energy sensing to enable the components 50 to determine the surface height.

The method additionally includes the step of generating a difference output dependent on the difference of outputs of the first and second photomultipliers 44A and 44B and using the difference output as a feedback signal to stabilize the image at its reference positon.

The method of the present invention further provides for amplitude modulating the beam with a modulating function and filtering an output of the sensor means by a filter (82A or 82B) allowing passage of the modulating function such that signals caused by background optical energy are rejected. The method further provides for dynamic range expansion by adjusting the intensity of the beam in inverse dependence on the reflected optical energy which is sensed.

Although various specific constructions and embodiments have been disclosed, it is to be understood that these are for illustrative purposes only. Various modifications and adaptations will be readily apparent to those of ordinary skill in the art. For example, components 50 may use digital circuits for the various feedback, control, and measuring functions performed by it. For another example, a single position sensing photomultiplier may be used in place of the two-photomultiplier system described above. Accordingly, it is to be understood that the scope of the present invention should be determined by reference to the claims appended hereto.

What I claim as new and desire to secure by Letters Patent of the United States is:

1. A system for determining profile information from a surface of an object comprising:
   (a) an optical beam source for generating an optical beam for application to the surface;
   (b) an image stabilization beam adjustor operable to receive the beam from said optical beam source and alter a beam deflection angle; and
   (c) sensor system means adapted to sense reflected optical energy corresponding to an image from the beam hitting the surface, and operable to sense any changes in the image position which are caused by variations in surface height, and connected to said image stabilization beam adjustor and being operable for causing the image stabilization beam adjustor to alter the beam deflection angle dependent on the sensed changes in the image position from a reference position in a Y-direction, said system tending to maintain the image in its reference position independent of variations in surface height, and wherein said sensor system means determines the surface height by detecting the amount of the beam deflection alteration.

2. The system of claim 1 wherein said image stabilization beam adjustor includes a controlled oscillator and acousto-optic device, said optical beam source is a laser, and said image stabilization beam adjustor provides beam deflection angle dependent upon the frequency of said controlled oscillator.

3. The system of claim 1 further comprising an X-scanner for causing the beam to scan the surface in an X-direction perpendicular to the Y-direction and wherein said system includes an X-indicating circuit having an output which indicates the X-position of the beam.

4. The system of claim 1 wherein said sensor system means further includes an intensity varying means for varying the power of the beam applied to the surface, said intensity varying means operable to cause amplitude modulation of the beam, the amplitude modulation using a modulating function; and a filter means to filter at least a first sensor output from said sensor means and to generate at least a first filtered output, said filter means allowing passage of signals at a frequency of said modulating function and rejecting other signals such that said first filtered output is substantially independent of background optical energy.

5. The system of claim 1 wherein said sensor system means further includes an intensity varying means for varying the average amplitude of the modulation of the beam applied to the surface and a feedback circuit connected between said sensor means and said intensity varying means, said feedback circuit operable to generate a reflection output dependent on the magnitude of the reflected optical energy sensed by said sensor means and operable to control the intensity varying means at least partly dependent on said reflection output so as to increase the average intensity of the beam for a relatively low reflection output and so as to decrease the average intensity of the beam for a relatively high reflection output.

6. The system of claim 1 wherein said sensor system means includes separate first and second sensors, each having a separate output, said first and second sensors operable to sense different portions of the reflected optical energy; and wherein said sensor system means includes a subtracter for producing a difference output dependent on the difference in outputs of said first and second sensors, and said difference output causes the image stabilization beam adjustor to compensate for any variations in surface height.

7. The system of claim 6 wherein optical energy within a field of view of said sensor system means is directed to either one or the other of said first and second sensors by a prism or a mirror which divides the optical energy along a sharp edge.

8. The system of claim 1 wherein the sensor system means includes at least one photomultiplier optical sensor.

9. A method of determining profile information from a surface of an object, the steps comprising:
   (a) directing an optical beam onto the surface;
   (b) sensing reflected optical energy corresponding to an image resulting from the beam hitting the surface, the image having a reference position in a Y-direction;
   (c) detecting any Y-direction changes of the image position as caused by variations in surface height;
   (d) altering the angle at which the beam is directed to the surface to compensate for changes of the image position which are caused by variations in the surface height such that the image will tend to maintain its reference postion; and
   (e) determining the surface height by detecting the amount of the alteration.

* * * * *